Oct. 5, 1965    A. L. CURRIER ETAL    3,209,806
FLOATINGLY MOUNTED CAPTIVE THUMBSCREW FASTENER
Filed Nov. 12, 1963

INVENTORS.
A. L. CURRIER
L. S. GIANNI
BY
ATTY.

United States Patent Office 3,209,806
Patented Oct. 5, 1965

3,209,806
FLOATINGLY MOUNTED CAPTIVE THUMBSCREW FASTENER
Albert L. Currier, San Mateo, and Larry J. Gianni, Redwood City, Calif., assignors, by mesne assignments, to Automatic Electric Laboratories, Inc., Northlake, Ill., a corporation of Delaware
Filed Nov. 12, 1963, Ser. No. 322,766
2 Claims. (Cl. 151—69)

This invention relates in general to captive screw fasteners and to methods for capturing a screw and mounting a fastener on a plate, and in particular to a design for a novel and improved fastener which is especially useful on electronic equipment panels, but is by no means limited to that application.

Captive screw fasteners are sometimes used on electronic equipment panels not only as a means for fastening an equipment drawer in a frame but also as a knob for pulling out the drawer when unfastened, thus eliminating the need for separate handles. Prior art fasteners have features which severely limit their usefulness in such applications. Some fasteners capture the screw in a previously mounted standoff by turning a retaining washer over the threads and onto the thinner, unthreaded portion of the shank. Others capture the screw by pushing a flexible collar located on the shank through the constricted end of the standoff until the constricted end seats itself in a groove on the collar. In these fasteners, retention of the screw can usually be overcome, in the former by turning the screw until the retaining washer backs off the threads, in the latter by pulling on the screw until the collar comes out of the standoff or the shank is pulled out of the collar. When the screw is thusly removed, it obviously cannot be used as a drawer handle. Also present is the danger of damaging the screw threads when pulling on the screw since the threads are the only holding diameter relative to the retaining washer or collar. Finally, the assembling tolerances inherent in these fasteners due to the rigid standoff mounting are so tight that out-of-line mounting can easily result in improper insertion of the captive screw in the threaded hole for receiving it, causing binding and thereby requiring more force than can be applied by hand to tighten and loosen it.

The design disclosed in the copending application of Ryner, Serial No. 323,035, filed November 12, 1963, provides for more positive capture and permanent retention of the captured screw by using a conical recess in the underside of the head of the screw to form the constricted end on a bushing, which in turn interferes with the threads on the screw to capture and retain it. However, the design does not eliminate either the possibility of damage to the screw threads or the tight assembling tolerances.

It is therefore an object of this invention to provide a novel and improved captive screw fastener design which incorporates the undercut screwhead disclosed in the copending Ryner application, along with improvement features which protect the screw threads and provide for loose assembling tolerances.

It is a further object of this invention to provide a novel method of screw capture and fastener mounting using the features inherent in the design of the fastener.

This invention features a flanged bushing and a flanged standoff which are secured together by the action of buckling a portion of the bushing into the counterbored portion of the hole in the standoff and which are, in the same operation, floatingly mounted in a counterbored hole to provide loose assembling tolerances.

This invention also features a screw with a collar on its shank to interfere with a constricted end formed on the bushing both to capture and retain the screw in the bushing and to protect the threads from damage.

Other objects and features and a more complete understanding of this invention will be obtained by referring to the following description in conjunction with the drawing, in which.

Figure 1:
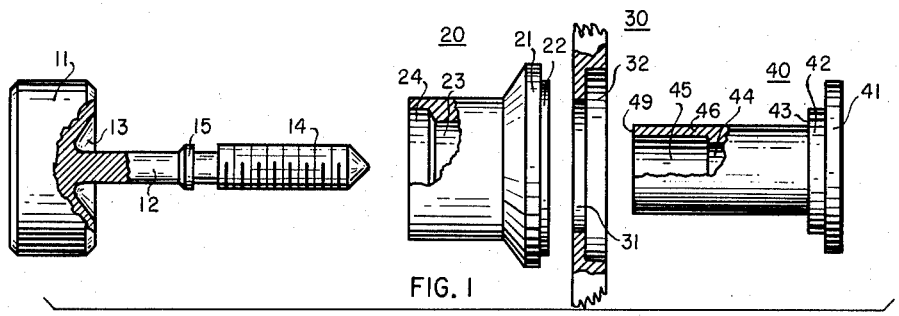
FIG. 1 is an exploded elevational view of the fastener and the plate on which the fastener is mounted with portions of each piece cut away to show inner features as they appear initially.

Referring to the drawing, reference character 10 designates a thumbscrew which may be formed of cold rolled steel; reference character 20 designates a standoff which may also be formed of cold rolled steel; reference character 30 designates a metal plate which may be the front panel of an electronic equipment drawer; and reference character 40 designates a bushing which may be formed of brass.

FIG. 1 shows each of the pieces that comprise the fastener in their initial form and the plate on which it is mounted. The thumbscrew 10 is comprised of a head 11 and a shank 12. The shank 12 has a threaded portion 14 and a collar 15 between the threaded portion and the head. The underside of the head has a conical recess 13 therein surrounding the shank 12.

The standoff 20 has a flange 21 of varying diameter at one end with an end portion 22 thereon. The standoff has a hole 23 through it with a counterbored portion 24 at the end opposite the flange 21.

The plate 30 has a hole 31 through it with a counterbored portion 32.

The bushing 40 has a flange 41 at one end. The portion 42 adjacent the flange forms a shoulder 43. The bushing has a hole 44 through it with a counterbored portion 45 at the end 49 opposite the flange 41, which forms a relatively thin-walled portion 46.

Figure 4:
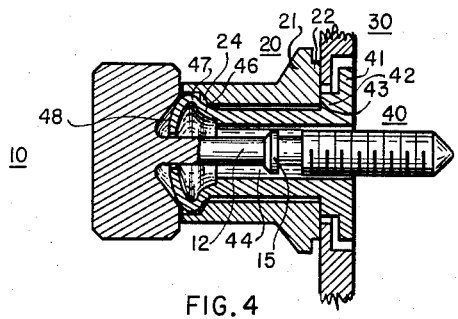
FIG. 4 is a sectioned elevational view of the completely assembled fastener.

FIG. 4 shows the pieces of the fastener completely assembled and mounted. The flange 41 on the bushing 40 is received by the counterbored portion of the hole in the plate. The portion 42 adjacent the flange is received by the hole in the plate. The thin-walled portion 46, which was initially straight, now has an enlarged portion 47 and a constricted end 48.

The hole in the standoff receives the bushing, and the counterbored portion 24 of the hole receives the enlarged portion 47 on the bushing to fasten the bushing and standoff together and to mount both on the plate 30. The end portion 22 on the flange 21 of the standoff has a diameter larger than the hole in the plate and abuts both the plate and the shoulder 43 on the bushing. The diameter of the portion 42 adjacent the flange 41 on the bushing is smaller than the diameter of the hole in the plate, the width of the portion 42 is greater than the thickness of the plate less the depth of the counterbored portion, and the diameter of the flange 41 is smaller than the diameter of the counterbored portion of the hole in the plate. These dimensions enable the bushing and standoff to float in the counterbored hole, i.e. the combination has some freedom of movement in all directions.

The shank 12 of the screw is received by the hole 44 in the bushing. The collar 15 on the shank interferes with the constricted end 48 of the bushing to retain the shank in the bushing. The screw is thus captured in the bushing, but it is free to move laterally until the collar interferes with the constricted end of the bushing.

Figure 2:
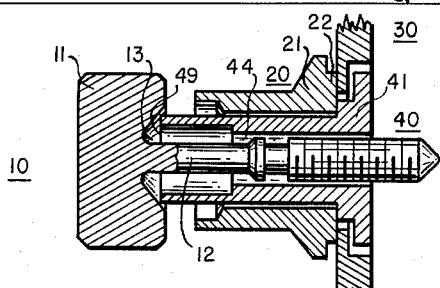
FIG. 2 is a sectioned elevational view of the pieces showing how they initially fit together.

The fastener is assembled and mounted in the following manner:

The bushing 40 is introduced into the counterbored hole 31 in the plate 30 until the flange 41 engages the plate in the counterbored portion 32. Then the standoff 20 is slipped over the bushing until the end portion 22 of the flange 21 on the standoff engages the plate 30. The shank 12 of the thumbscrew 10 is then inserted into the hole 44 on the bushing, and the conical recess 13 on the underside of the head 11 of the thumbscrew is placed on the end 49 of the bushing as a forming means. When these steps have been completed, the fastener appears as shown in FIG. 2.

Figure 3:
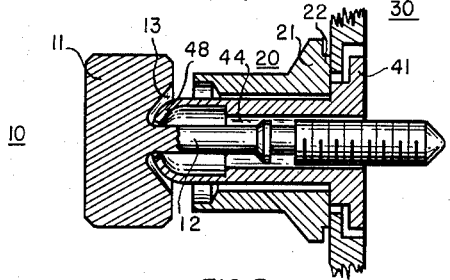
FIG. 3 is a sectioned elevational view of the pieces partially assembled showing the constriction of the end of the bushing under a force applied between the screw and the bushing.

The next step is to force the end 49 of the bushing 40 into the conical recess 13 to form the constricted end 48 as shown in FIG. 3. This force may be applied by a back-up vise or similar tool. Finally, as the forcing of the bushing into the conical recess is continued, the bushing buckles into the counterbored portion 24 of the hole 23 in the standoff. The assembling and mounting is then complete as shown in FIG. 4 and previously described.

The capture of the screw and the mounting of the assembled fastener is accomplished in one operation and the design features of the invention are used to accomplish this. The screw is captured by forming the constricted end on the bushing using the conical recess in the screwhead as taught in the co-pending Ryner application; but at the same time, the conical recess helps to form the enlarged portion of the bushing which is received by the counterbored portion of the hole in the standoff, thus securing bushing and standoff together and the assembled fastener to the plate.

The threads on the screw are protected by the collar on the shank which prevents them from coming in contact with the constricted end of the bushing. Furthermore, the assembling tolerances are loose because of the floating action of the fastener when mounted in the counterbored hole. If the centerline of the counterbored hole does not coincide with that of a hole for receiving the threads on the screw, the floating action reduces the tendency for the screw to bind upon insertion.

While the above description discloses one embodiment of this invention, it is to be understood that numerous changes could be made without departing from the scope of this invention. For example, a separate tool may be used to form the constricted end and buckled portion on the bushing; the shoulder on the bushing and the counterbored portion of the hole in the plate could be eliminated, thereby eliminating the float feature; and the collar on the shank of the screw could be positioned closer to the head to reduce or eliminate the possible lateral motion of the shank in the bushing after capture.

What is claimed is:

1. A captive screw type fastener for mounting on a plate having two sides and a round hole therethrough with a counterbored portion, said fastener comprising, in combination:

a hollow cylindrical bushing having a flange at one end and a shoulder formed by the portion adjacent the flange, said bushing being insertable in said hole in said plate with said flange being received by said counterbored portion and with the free end of said bushing extending beyond one side of the plate, said flange having an outer diameter smaller than the diameter of the counterbored portion and greater than the diameter of the hole, said portion adjacent the flange having an outer diameter smaller than the diameter of the hole and a length greater than the thickness of the plate less the thickness of the counterbored portion;

a cylindrical standoff having a hole therethrough with an enlarged bore portion at one end, said standoff having a flange at the other end larger than the hole in the plate, said standoff being mountable over said bushing and being of a length such that the free end of said bushing extends axially beyond the first-mentioned end of said standoff with said flange on said standoff abutting said shoulder on said bushing; and a screw having a head and a shank, said shank having a threaded portion and a shoulder spaced from the head, said shank being insertable in said bushing, said head having an underside with a recess therein including an inclined surface providing means, responsive to an axially directed clamping force applied between said head and said bushing, to constrict permanently the free end of said bushing to a diameter such that said free end interferes with the shoulder on the shank of said screw to capture said screw in said bushing, and to buckle a portion of said bushing into said enlarged bore portion of said standoff to secure said bushing in said standoff, whereby the assembly of bushing, standoff and screw is floatingly mounted on the plate.

2. A captive screw type fastener for mounting on a plate having two sides and a round hole therethrough with a counterbored portion, said fastener comprising, in combination:

a hollow cylindrical bushing having a flange at one end and a shoulder formed by the portion adjacent the flange, said bushing being insertable in said hole in said plate with said flange being received by said counterbored portion and with the free end of said bushing extending beyond one side of the plate, said flange having outer diameter smaller than the diameter of the counterbored portion and greater than the diameter of the hole, said portion adjacent the flange having outer diameter smaller than the diameter of the hole and a length greater than the thickness of the plate less the thickness of the counterbored portion;

a cylindrical standoff having a hole therethrough with an enlarged bore portion at one end, said standoff having a flange at the other end larger than the hole in the plate, said standoff being mountable over said bushing and being of a length such that the free end of said bushing extends beyond the first-mentioned end of said standoff with said flange on said standoff abutting said shoulder on said bushing; and a screw having a head and a shank, said shank having a threaded portion and a shoulder spaced from the head, said shank being insertable in said bushing; and forming means on the underside of said screw head including an inclined surface being engageable with the free end of said bushing and being effective to constrict permanently said free end to a diameter such that said free end interferes with the shoulder on the shank of said screw to capture said screw in said bushing and to buckle a portion of said bushing into said enlarged bore portion of said standoff to secure said bushing into said standoff upon application of a clamping force between said forming means and said bushing, whereby the assembly of bushing, standoff and screw is floatingly mounted on the plate.

(References on following page)

References Cited by the Examiner

UNITED STATES PATENTS

| | | | |
|---|---|---|---|
| 834,273 | 12/05 | Denney | 85—37 |
| 1,385,799 | 7/21 | Smith | 85—37 |
| 2,563,992 | 8/51 | De Grave | 29—520 |
| 3,126,935 | 3/64 | Tuozzo | 151—69 |

FOREIGN PATENTS

| | | |
|---|---|---|
| 27,896 | 9/11 | Great Britain. |
| 378,617 | 8/32 | Great Britain. |
| 417,895 | 10/34 | Great Britain. |
| 720,884 | 12/54 | Great Britain. |
| 161,489 | 11/57 | Sweden. |

CARL W. TOMLIN, *Primary Examiner.*

EDWARD C. ALLEN, *Examiner.*